United States Patent
Ackermann et al.

(10) Patent No.: US 7,609,854 B2
(45) Date of Patent: Oct. 27, 2009

(54) METHOD FOR DISPLAYING MEDICAL IMAGE INFORMATION DEPENDENT ON A DETECTED POSITION OF THE OBSERVER

(75) Inventors: Rudolf Ackermann, Buckenhof (DE); Holger Dresel, Altendorf (DE); Sultan Haider, Erlangen (DE); Rainer Kuth, Herzogenaurach (DE); Klaus Ludwig, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 560 days.

(21) Appl. No.: 11/146,872

(22) Filed: Jun. 7, 2005

(65) Prior Publication Data
US 2005/0272994 A1 Dec. 8, 2005

(30) Foreign Application Priority Data
Jun. 7, 2004 (DE) ............ 10 2004 027 670

(51) Int. Cl.
*G06K 9/00* (2006.01)
(52) U.S. Cl. ............ 382/103; 345/158; 345/421; 348/59; 382/128
(58) Field of Classification Search .......... None
See application file for complete search history.

(56) References Cited

U.S. PATENT DOCUMENTS

| 5,566,282 | A | | 10/1996 | Zuiderveld |
| 5,777,720 | A | * | 7/1998 | Shapiro et al. ............ 351/237 |
| 5,959,631 | A | | 9/1999 | Knittel |
| 5,995,108 | A | * | 11/1999 | Isobe et al. ............ 345/421 |
| 6,215,471 | B1 | * | 4/2001 | DeLuca ............ 345/158 |
| 6,377,295 | B1 | * | 4/2002 | Woodgate et al. ............ 348/59 |
| 7,339,587 | B2 | * | 3/2008 | Kropfeld ............ 345/424 |
| 2002/0046100 | A1 | * | 4/2002 | Kinjo ............ 705/14 |
| 2003/0234781 | A1 | | 12/2003 | Laidlaw et al. |

FOREIGN PATENT DOCUMENTS

EP          1 396 781        3/2004

* cited by examiner

*Primary Examiner*—Brian P Werner
*Assistant Examiner*—Claire Wang
(74) *Attorney, Agent, or Firm*—Schiff Hardin LLP

(57) ABSTRACT

In a method for representation of medical image information on a display medium an image representation parameter is varied dependent on the position of the observer. Superimpositions of data sets from different medical examinations are thereby displayed. The observer thus has simultaneous access to information from the medical examinations, which makes the diagnosis easier for him or her.

11 Claims, 2 Drawing Sheets

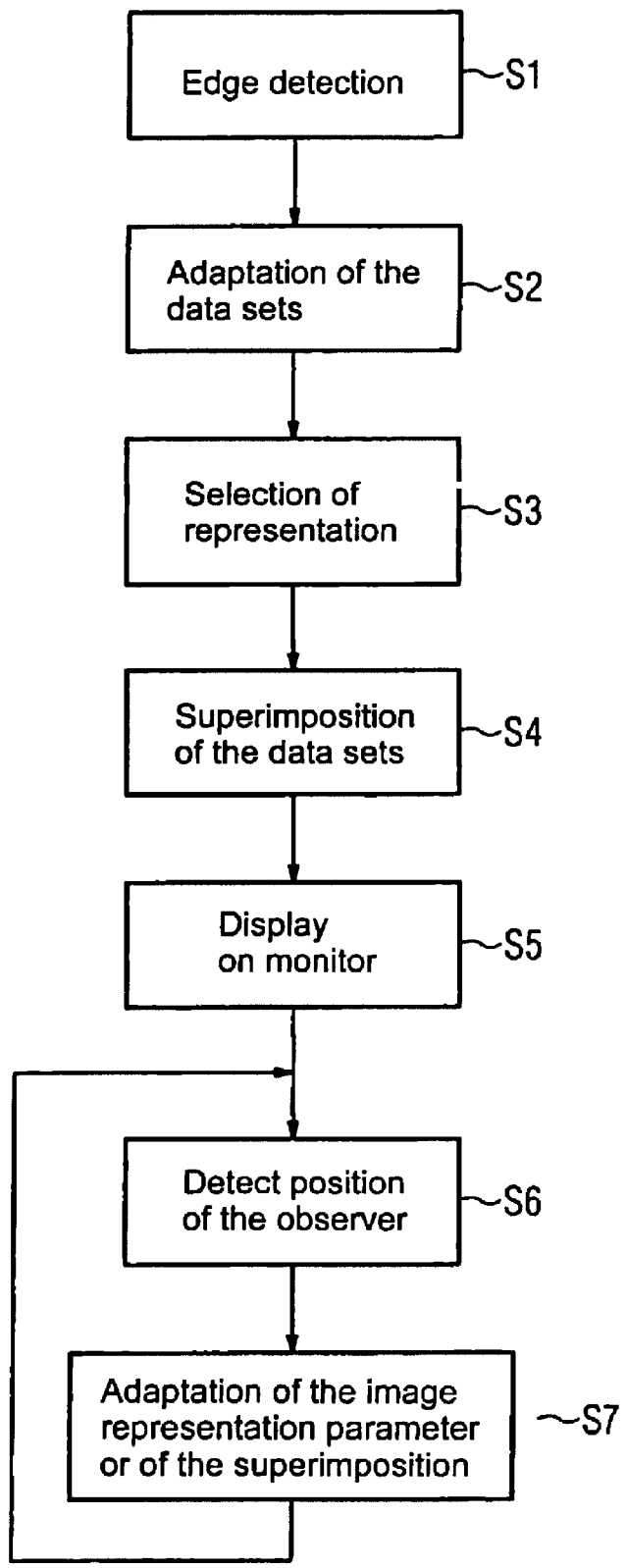

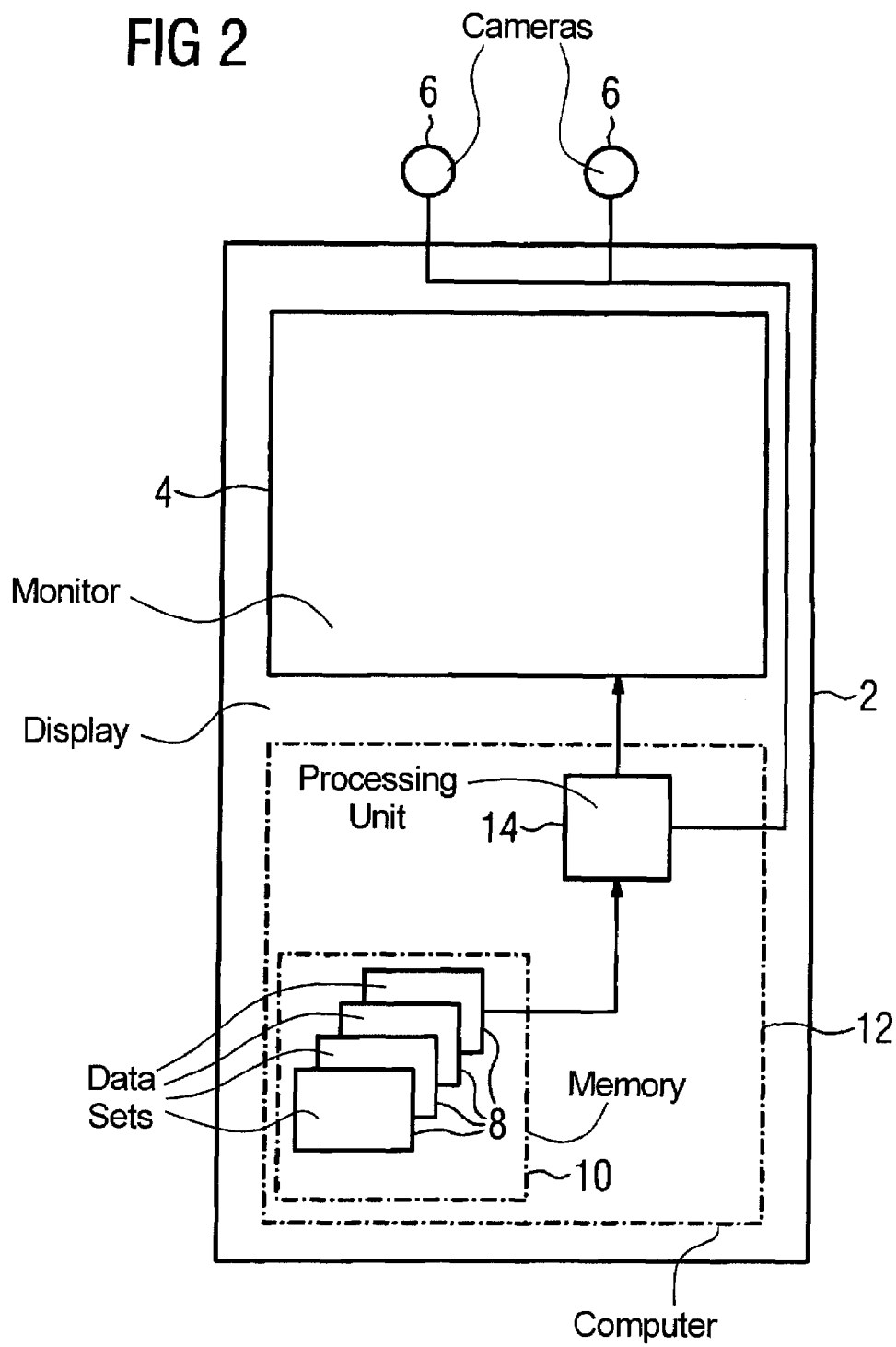

METHOD FOR DISPLAYING MEDICAL IMAGE INFORMATION DEPENDENT ON A DETECTED POSITION OF THE OBSERVER

BACKGROUND OF THE INVENTION

1. Field of the Invention

The present invention concerns a method for representation of medical image information on a display medium.

2. Description of the Prior Art

In medical diagnostics, a series of results of various examination methods frequently contributes to the generation of a diagnosis. These can be, for example, magnetic resonance scans, computed tomography scans or ultrasound scans. To generate the diagnosis, an observer, for example a diagnosing doctor, relies on a graphical representation of measured data sets on a display medium, for example a monitor. The representation on the monitor plays a decisive role in making a finding from the data sets. Thus, for example, the contrast and the brightness of the representation are important in magnetic resonance images. With known computer-based systems such image display parameters can be changed, for example, with a mouse and thus the representation on the monitor can be changed. The variation is limited to the degree of freedom that can be achieved by selection with various functions. The user could, for example, initially adapt the contrast of the considered data set with the mouse and subsequently adapt the brightness (likewise with the mouse), but this is not possible simultaneously.

Various methods are known to optimize the display and preparation of medical information towards special diagnostic applications. For visualization it is known to generate pseudo-3D representations that are then displayed on a 2D monitor. The technique of maximum projection (maximum intensity projection; in particular significant for angiography) is an example. In this method a maximum intensity value of grey values encountered in a projection ray is selected and imaged in an observer image plane. In the maximum projection, an entire volume of a 3D data set is mapped and can be observed in any direction. Maximum projection is described in U.S. Pat. No. 5,566,282. A disadvantageous of this known method is also that the diagnosing observer cannot simultaneously review the information from various diagnostic examinations.

The image information shown on a monitor frequently includes a number of partial data sets that are, for example, processed and displayed according to the method described above. In general the partial data sets map a spatial section of the patient, for example the head. A number of slices thus can be reproduced in a magnetic resonance scan of various locations of the head of the patient. The method of maximum projection offers the possibility to simultaneously reproduce the information from the various slices on the monitor. If, however, a number of data sets from various medical examinations, for example magnetic resonance and computed tomography examinations, are to be assessed, high demands are placed on the imagination capability of the observer, since frequently only a combination of information resulting from the data sets leads to a correct diagnosis.

SUMMARY OF THE INVENTION

An object of the present invention to provide a method for representation of medical image information that makes a diagnosis from various diagnostic examinations easier for the observer.

The object is achieved in accordance with the invention by a method wherein the position of the observer is detected with respect to the display medium and, dependent on the position of the observer, various superimpositions of at least two medical data sets are displayed as image information. For example, data sets can be displayed from magnetic resonance T1 contrast, magnetic resonance T2 contrast, magnetic resonance phosphor signal, ultrasound at low frequency, ultrasound at high frequency, computed tomography at low acceleration voltage or computed tomography at high acceleration voltage. The representation can be altered by the dependency of the superimposition on the position of the observer, such that (for example) the data set of the magnetic resonance T1 contrast examination is more strongly emphasized than that of the magnetic resonance T2 contrast. This has the advantage that the observer changes the superimposition in a simple manner and thus can adapt the directly viewed representation to his or her desires. An additional degree of freedom for alteration of the representation is thus available to the observer of the image information in addition to the typical interfaces between the observer and the display medium (such as, for example, the mouse of a connected computer).

Each of the superimpositions can be generated by simultaneous display of the data sets, with each data set being weighted with a weighting factor. This is a simple method for generation of the superimpositions.

At least one image representation parameter can be selectively varied dependent on the position of the observer. The image representation parameter can be, for example, the contrast or the brightness of the displayed image information. A number of selectable image representation parameters preferably is available to the observer for selection. As soon as the desired superimposition is displayed, the user can switch over (by clicking with the computer mouse) from the change of the superimposition dependent on the position to the change of a different image representation parameter, thus for example the brightness. The brightness of the shown image (and not the superimposition) is then varied via changing of the position of the observer. This offers further possibilities to adapt the representation of the image information in a simple manner. A switchover to the previous mode in which again the superimposition is changed dependent on the position is possible at any time.

The contrast of the displayed image information can be altered dependent on the position of the observer. To generate a diagnosis, the observer thus has the possibility to adapt the representation of the image information to his or her requirements in a simple manner. This is (for example in the observation of magnetic resonance images) easier for the observer since here the contrast of the displayed image information plays a large role.

In a further embodiment, at least one of the data sets is generated from a number of partial data sets by maximum projection. This known method of display of data sets is here combined with the inventive method in an advantageous manner. The maximum projection, for example, can separately ensue before the generation of the superimposition for each of the data sets to be shown. In the case of two data sets to be superimposed, two views that are then shown superimposed are created from a number of partial data sets. This is frequently advantageous for the generation of a diagnosis.

A further embodiment uses a parameterized volume rendering technique for generation of at least one of the data sets. The different tissue classes are allocated with various surfaces such that they appear in a pseudo-3D representation and can clearly be differentiated from one another.

DESCRIPTION OF THE DRAWINGS

FIG. 1 is a flowchart of the inventive method.

FIG. 2 schematically illustrates an apparatus for implementing the method of FIG. 1.

DESCRIPTION OF THE PREFERRED EMBODIMENTS

FIG. 1 shows the preparation and representation of the various data sets in a flowchart. Initially, in a first method step S1 an edge detection is implemented with each data set, this edge detection being used in a second method step S2 for adaptation of the data sets to one another. This is necessary since the data sets of the different medical examinations do not necessarily exactly contain an identical part of a respective examination subject. For example, in the edge detection a boundary between muscle and bone tissue can be identified as an edge that is then brought into congruence in all data sets to be considered. In a third step S3, the user selects the desired type of the representation. The type of the representation, for example, can be maximum projection, partial partially transparent representation of surfaces or parameterized volume rendering technique representation. After this, in a fourth method step S4 the representation of the data sets is calculated from partial data sets according to the selected representation method and the corresponding representations are superimposed. The image information resulting from this is shown on a monitor in a further step S5.

After this, the position of the observer is detected in the step S6. The eyes of the observer are registered with a CMOS camera that is arranged above the monitor. A reference point is placed at the center point between the eyes by an image evaluation system. If the position of the reference point changes, the superimposition is correspondingly changed in a step S7. The superimposition between the individual data sets is varied with variation of the position of the observer. If, for example, two magnetic resonance data sets should be shown, of which one was acquired with T1 weighting and the other was acquired with T2 weighting, the display is selected such that the observer sees only the T1-weighted data set from a lateral position to the right of the center of the monitor. Correspondingly, only the T2-weighted data set is displayed for the corresponding position to the left of the center of the monitor. For each position in-between, both data sets are displayed superimposed, whereby they are previously multiplied with weighting factors. Given a position in front of the middle of the monitor, both data sets are thus shown multiplied with the weighting factor of 0.5. Given a change of the position to the right, the T1-weighted data set is more strongly weighted (thus weighted with 0.75, the T2-weighted data set weighted with 0.25 given a position of, for example, 10 cm to the right of the center of the monitor). The brightness of the pixel is composed from the brightnesses of the respective pixels of the T1 image and the T2 image. They can, for example, be calculated by the formula $$H(x) = \left| \frac{1}{2x_{\min}}(x + x_{\min}) \right| T_1 + \left| 1 - \frac{1}{2x_{\min}}(x + x_{\min}) \right| T_2$$

wherein $T_1$ and $T_2$ specify the brightnesses of the respective pixel in the T1 and T2 images, x is the position of the observer along an imaginary horizontal line through the center of the monitor, with x=0 being at the center of the monitor, and $x_{min}$ is the x-value of the position at which the observer is located furthest to the right of the center of the monitor. At this position, only the T1-weighted data set is shown since the weighting factor for the T2 data set is zero. An x-value $x_{max}$ exists at the position at which the observer is located farthest to the right of the center of the monitor. $x_{max}=-x_{min}$ is thereby valid. Given $x=x_{max}$, consequently only the T2-weighted data set is shown while the weighting factor for the T1 data set is zero.

By the weighted superimposition of both data sets, the doctor has direct access to both sets of information, making the diagnosis easier for him or her.

The last steps S6 and S7 are continuously executed in a loop during the display of the image. The superimposition is continuously adapted to the position change. The possibility thus is always available to the observer to select a different image representation parameter with the mouse, such that the immediately shown superimposition is retained and, for example, the brightness or the contrast is changed dependent on the position.

In an alternative exemplary embodiment, the position change of the observer is registered two-dimensionally. Two image representation parameters can thus be simultaneously changed dependent on the position, thus for example the superimposition of the shown image in the horizontal direction x and the contrast of the shown image in the vertical direction y. Here as well the image representation parameters can be freely selected for each direction. More than two data sets can also be shown superimposed. The superimposition of two data sets thus can be changed in the horizontal direction, the additional superimposition of a third data set can be changed in the vertical direction. The formula cited above is correspondingly expanded in the y-direction.

For example, the observer can have a superimposition of various magnetic resonance measurements displayed with the described method. In particular T1-weighted and T2-weighted images are important for diagnostics since they show tissue contrasts in a different manner. By the weighted superimposition of both images, the observer has immediate access to both sets of information, with the diagnosis being made easier for him or her.

FIG. 2 shows a display medium 2 fashioned for execution of the method, with a monitor 4 and two cameras 6 for detection of the position of the observer. The data sets 8 are stored, for example, in a memory 10 of a computer 12. They are weighted by a processing unit 14 and shown on the monitor 4. The weighting is changed for each position of the observer, such that the observer sees a different representation of the data sets by changing his or her position. The position of the observer is continuously detected by the two cameras 6 and the weighting is correspondingly changed by the processing unit 14.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for displaying medical image information comprising the steps of:

detecting a position of an observer relative to a display screen; and in a processor provided with medical data sets respectively representing different medical diagnostic images of the same region of a subject, generating and displaying a superimposition of medical data sets, comprised of relative, respective contributions of each data set to the superimposition, to produce a displayed, superimposed image of said region on said display screen, and said processor setting said relative, respective contributions of each data set to said superimposition simultaneously with and solely dependent on the detection of the position of the observer relative to said display screen, and changing an appearance of said displayed superimposed image of said region to the observer by changing said relative, respective contributions simultaneously with and solely dependent on a change in the detection position of the observer.

2. A method as claimed in claim 1 comprising generating said superimpositions by simultaneously displaying at least two of said data sets weighted with respective weighting factors.

3. A method as claimed in claim 1 comprising altering at least one image representation parameter associated with displaying said medical image information, dependent on said detected position of the observer.

4. A method as claimed in claim 3 comprising altering brightness as said image representation parameter.

5. A method as claimed in claim 3 comprising altering contrast as said image representation parameter.

6. A method as claimed in claim 1 comprising generating at least one of said data sets from a plurality of partial data sets by maximum projection.

7. A method as claimed in claim 1 comprising generating at least one of said data sets from a plurality of partial data sets by a partially transparent representation of surfaces.

8. A method as claimed in claim 1 comprising generating at least one of said data sets from a plurality of partial data sets by a parameterized volume rendering technique.

9. A method as claimed in claim 1 comprising detecting edges of said data sets with an edge detection algorithm.

10. A method as claimed in claim 9 comprising adapting the respective data sets to each other at said display screen dependent on the detected edges.

11. A method as claimed in claim 1 comprising displaying said different medical diagnostic images as two-dimensional medical images at said display.

* * * * *